UNITED STATES PATENT OFFICE.

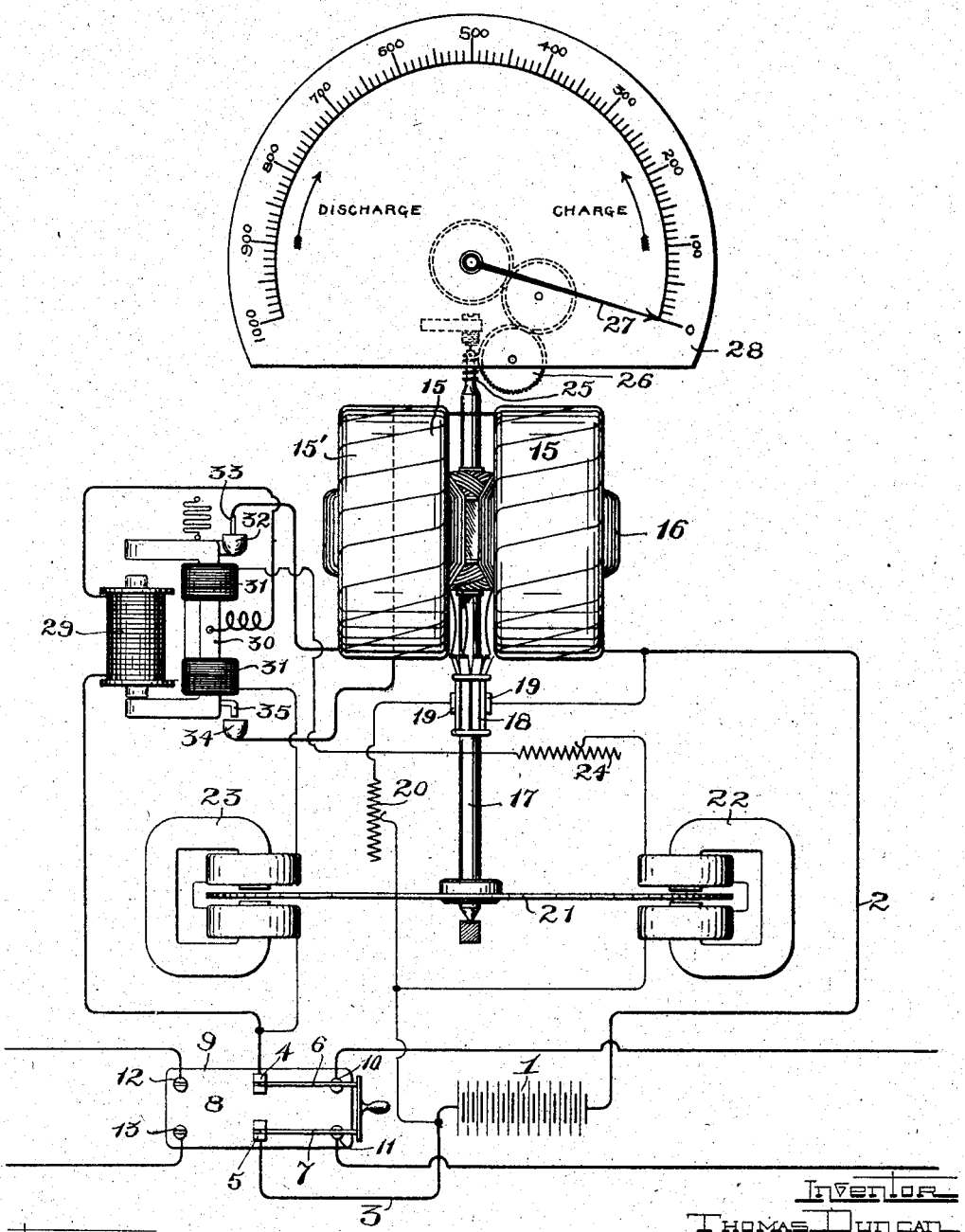

THOMAS DUNCAN, OF CHICAGO, ILLINOIS.

ELECTRIC METER.

No. 796,044.     Specification of Letters Patent.     Patented Aug. 1, 1905.

Application filed July 18, 1901. Serial No. 68,759.

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawing, forming a part of this specification.

My invention relates to storage-battery meters, and has for its object the provision of improved means whereby the meter may operate at one rate per unit of load or energy while the battery is being charged and at an increased rate per unit of load or energy while the battery is discharging to compensate for battery loss.

The invention has two features, one being the means for effecting the control or application of the agency employed to modify the speed of the instrument and the other the particular agency employed for this purpose.

I provide electromagnetic mechanism, included in circuit with the battery, which is adapted to operate in alternative ways through the agency of the current that is passing to the battery from the exciting-machine or passing from the battery to the load, the said electromagnetic means thereby serving to change the relation of the speed-modifying means of the meter to cause the same to travel at an increased rate per unit of load or energy when the storage battery is in circuit with translating means and at a decreased rate of speed per unit of load or energy when the storage battery is being charged.

The means that I prefer to employ for modifying the speed of the meter per unit of load or energy comprises a meter-winding, which is preferably employed for modifying the torque of the instrument. The meter-winding is preferably entirely included in circuit with the storage battery to produce the greatest torque per unit of load or energy when the battery is in circuit with translating means to compensate for battery loss. A portion of the meter-winding is excluded from circuit when the storage battery is connected with the charging-machine to reduce the torque of the meter per unit of load or energy. This change effected in the amount of the said winding included in circuit with the storage battery is preferably automatically effected through the agency of the aforesaid electromagnetic means; but I do not wish to be limited in all embodiments of my invention to a meter possessing both of these features.

The divisible winding of the meter is preferably in the form of a current-winding that is included in series with the battery, a pressure-winding being also provided that is preferably in the form of an armature mounted upon the rotating element of the meter. The instrument may be caused to measure in units of watts or ampere-hours.

When the meter is adapted for measuring the units in ampere-hours, I dispense with the permanent magnets ordinarily employed in combination with a damping-disk provided upon the shaft of the instrument and substitute therefor an electromagnetic brake that is included across the battery-mains, so that while a variation in the pressure to which the armature is subject would naturally tend to cause a corresponding variation in the speed of the instrument this tendency is compensated for by means of the electromagnetic brake producing coincidently a field corresponding to the strength of the armature and coöperating with the armature-field to maintain a uniform rate of speed per unit of load or energy with the battery in its association with the translating means and at another uniform rate of speed per unit of load or energy with the battery in its association with the charging-machine. Thus if the pressure impressed upon the armature should be doubled the pressure upon the damping electromagnetic device will be correspondingly doubled, thereby maintaining the speed of the instrument proportional to the current, so that the measurements may be taken in units of ampere-hours.

I will explain my invention more fully by reference to the accompanying drawing, which illustrates a storage battery and a switching mechanism for connecting the storage battery with a translating means, as a motor, in combination with a meter of my invention.

A storage battery 1 is provided with leads or mains 2 and 3, which terminate in pivotal supports 4 and 5, upon which pivotal supports are mounted the blades 6 and 7 of a circuit-changing switch 8. The switch is mounted upon a base 9, which carries the terminals 10 and 11 of conductors leading to translating means and terminals 12 and 13 of conductors leading to a charging-machine or other suitable source of current for supplying the storage battery.

The meter is provided with current-winding, subdivided into coils 15 15 and 15', included or adapted for inclusion in circuit with the main 2. The armature of the meter is preferably in the form of a winding 16, connected across the battery-mains to be subject to the pressure of the battery, this armature being mounted upon a spindle 17, that supports a commutator 18, connected with the armature and engaging brushes 19 19 for including the armature in circuit. A choking resistance 20 may be included in the armature-circuit to prevent an undue flow of current through the armature. The armature-shaft is provided at its lower end with a damping-disk 21, arranged within the fields of damping-magnets 22 23, which in this instance are in the form of electromagnets, whose windings are included in bridge between the battery-mains, whereby the rotating element of the meter may operate to effect measurement in units of ampere-hours. A choking resistance 24 may also be included in circuit with the windings of the damping-magnets to prevent an undue flow of current through the same. The upper end of the armature-shaft is provided with a worm 25, engaging the wheels of a counting-train 26, that serve to actuate the index or needle 27, registering with scale-marks upon the dial 28, marked in this instance in units of ampere-hours, the needle being adapted to move in a contra-clockwise direction while the storage battery is being charged and moving in a clockwise direction when the battery is discharging. I provide means for cutting out the coil 15' when the storage battery is connected with the charging-machine, so that the torque of the meter is reduced. When the storage battery is connected with the translating means, the coil 15' is included in circuit, so as to increase the effective torque of the meter per unit of load or energy to compensate for battery loss. As one means for accomplishing this control of the coil 15' I may employ an electromagnet 29, included in series with the windings 15 15 15', which electromagnet operates a switch to cut the coil 15' into and out of circuit. The switching mechanism may comprise an armature 30, uniformly polarized by a winding subdivided into coils 31, included in bridge of the battery-mains and preferably in series with the windings of the damping-magnets 22 23. The armature 30 carries a cup 32, containing mercury, into which a terminal 33 may dip when the storage battery is in circuit with the translating means, the magnet 29 being then energized to move the armature 30 upwardly to bring about an insertion of the terminal 33 within the cup 32. The terminal 33 is an extreme terminal of the meter-winding, serving to include all the coils 15 15 15' in circuit to produce the greatest torque per unit of load or energy, whereby battery loss may be compensated for while the battery is in circuit with the translating means. An intermediate terminal 34, constituting a terminal of the left-hand coil 15, may be in the form of a mercury-cup, into which a terminal 35 electrically connected with the armature may be caused to dip when the storage battery is in circuit with the charging-machine. When this result is effected, the terminals 32 and 33 are disconnected, so that the coil 15' is cut out of circuit, thereby reducing the ampere-turns of the current-winding to reduce the torque of the meter per unit of load or energy while the battery is in circuit with the charging-machine. The terminals 32 and 35 are preferably connected with the main 2 between the electromagnet 29 and the current field-winding, which connection may be effected by connecting this portion of the main 2 with the armature 30.

I do not wish to be limited to the particular apparatus used in coöperation with the electromagnetic controlling means for changing the rate of speed of the meter per unit of load or energy.

I have herein shown and particularly described the preferred embodiment of my invention; but it is obvious that changes may readily be made without departing from the spirit of my invention, and I do not, therefore, wish to be limited to the precise disclosure herein set forth; but,

Having thus described my invention, I claim as new and desire to secure by Letters Patent—

1. The combination with a storage battery, of a switch for changing the connection thereof from a charging-machine to translating means, and vice versa, a meter receiving current passing to and from the storage battery, and means whereby a portion of a meter-winding may be excluded from circuit with the battery, substantially as described.

2. The combination with a storage battery, of a switch for changing the connection thereof from a charging-machine to translating means and vice versa, a meter having a winding in series with the battery, and means whereby a portion of the said winding may be excluded from circuit with the battery, substantially as described.

3. The combination with a storage battery, of a switch for changing the connection thereof from a charging-machine to translating means and vice versa, a meter receiving current passing to and from the storage battery, and electromagnetic controlling means for reducing the rate of operation of the meter per unit of load or energy when the storage battery is being charged, substantially as described.

4. The combination with a storage battery, of a switch for changing the connection thereof from a charging-machine to translating means and vice versa, a meter receiving current passing to and from the storage battery, means for changing the rate of operation of the meter per unit of load or energy, and electromagnetic means included in circuit with the battery for effecting the application of the aforesaid means, substantially as described.

5. The combination with a storage battery, of a switch for changing the connection thereof from a charging-machine to translating means and vice versa, a meter receiving current passing to and from the storage battery, means for changing the rate of operation of the meter per unit of load or energy, and electromagnetic means included in circuit with the battery for effecting the application of the aforesaid means, the said electromagnetic means being provided with a polarized armature adapted to actuate the aforesaid means, which armature is actuated in one direction or the other, according to the direction of current passing through the electromagnetic means, substantially as described.

6. The combination with a storage battery, of a switch for changing the connection thereof from a charging-machine to translating means, and vice versa, a meter receiving current passing to and from the storage battery, switching apparatus for changing the amount of meter-winding to modify the speed per unit of load or energy to compensate for battery loss, and electromagnetic means included in circuit with the battery for effecting the operation of the said switching apparatus, substantially as described.

7. The combination with a storage battery, of a switch for changing the connection thereof from a charging-machine to translating means and vice versa, a meter receiving current passing to and from the storage battery, switching apparatus for changing the amount of meter-winding to modify the speed per unit of load or energy to compensate for battery loss, and electromagnetic means included in circuit with the battery for effecting the operation of the said switching apparatus, the said electromagnetic means being provided with a polarized armature adapted to actuate the aforesaid means, which armature is actuated in one direction or the other, according to the direction of current passing through the electromagnetic means, substantially as described.

8. The combination with a storage battery, of a meter receiving current passing to and from the storage battery, and means whereby a portion of the meter-winding may be excluded from circuit with the battery, substantially as described.

9. The combination with a storage battery, of a meter having a winding in series with the battery, and means whereby a portion of the said winding may be excluded from circuit with the said battery, substantially as described.

10. The combination with a storage battery, of a meter having a winding in series with the battery, and means whereby a portion of the said winding may be excluded from circuit with the said battery, said meter being also provided with a rotatably-mounted pressure-winding coöperatively associated with the current-winding, substantially as described.

11. The combination with a storage battery, of a meter receiving current passing to and from the storage battery, and electromagnetic controlling means for reducing the rate of operation of the meter per unit of load or energy when the storage battery is being charged, substantially as described.

12. The combination with a storage battery, of a meter receiving current passing to and from the storage battery, means for changing the rate of operation of the meter per unit of load or energy, and electromagnetic means included in circuit with the battery for effecting the application of the aforesaid means, substantially as described.

13. The combination with a storage battery, of a meter receiving current passing to and from the storage battery, switching apparatus for changing the amount of meter-winding to modify the speed per unit of load or energy to compensate for battery loss, and electromagnetic means included in circuit with the battery for effecting the operation of said switching apparatus, substantially as described.

14. The combination with a storage battery, of a meter receiving current passing to and from the storage battery, switching apparatus for changing the amount of meter-winding to modify the speed per unit of load or energy to compensate for battery loss, and electromagnetic means included in circuit with the battery for effecting the operation of said switching apparatus, the said electromagnetic means being provided with a polarized armature adapted to actuate the aforesaid means, which armature is actuated in one direction or the other according to the direction of current passing through the electromagnetic means, substantially as described.

15. The combination with an electrical circuit through which a current may pass in one direction or the other, of a switch for changing the direction of current therein, a meter receiving current passing through said circuit, and means whereby a portion of the meter-winding may be excluded from connection with said circuit, substantially as described.

16. The combination with an electrical circuit through which a current may pass in one direction or the other, of a switch for changing the direction of current therein, a meter having a winding in series with said circuit, and means whereby a portion of the said winding may be excluded from connection with said circuit, substantially as described.

17. The combination with an electrical circuit through which current may pass in one direction or the other, of a switch for changing the direction of current through said circuit, a meter receiving current passing to and from said circuit, means for changing the rate of operation of the meter per unit of load or energy on said circuit, and electromagnetic means included in said circuit for effecting the application of the aforesaid means, the said electromagnetic means being provided with a polarized armature adapted to actuate the aforesaid means, which armature is actuated in one direction or the other according to the direction of current passing through the electromagnetic means, substantially as described.

18. The combination with an electrical circuit through which current may pass in one direction or the other, of a meter receiving current passing through said circuit, switching apparatus for changing the amount of meter-winding to modify the speed per unit of load or energy on said circuit, and electromagnetic means included in said circuit for effecting the operation of said switching apparatus, substantially as described.

19. The combination with an electrical circuit through which a current may pass in one direction or the other, of a meter receiving current passing through said circuit, and means whereby a portion of the meter-winding may be excluded from connection with said circuit, substantially as described.

20. The combination with an electrical circuit through which a current may pass in one direction or the other, of a meter having a winding in series with said circuit, and means whereby a portion of the said winding may be excluded from connection with said circuit, substantially as described.

21. The combination with an electrical circuit through which current may pass in one direction or the other, of a meter receiving current passing to and from said circuit, means for changing the rate of operation of the meter per unit of load or energy on said circuit, and electromagnetic means included in said circuit for effecting the application of the aforesaid means, the said electromagnetic means being provided with a polarized armature adapted to actuate the aforesaid means, which armature is actuated in one direction or the other according to the direction of current passing through the electromagnetic means, substantially as described.

22. The combination with a storage battery, of a switch for changing the connection thereof from a charging-machine to translating means and vice versa, a meter having a winding in series with the battery, and means whereby a portion of the said winding may be excluded from circuit with the battery, the said meter being also provided with a rotatably-mounted pressure-winding coöperatively associated with the current-winding, substantially as described.

In witness whereof I hereunto subscribe my name this 27th day of June, A. D. 1901.

THOMAS DUNCAN.

Witnesses:
GEORGE L. CRAGG,
HARVEY L. HANSON.